US012781935B2

(12) United States Patent
Fischer

(10) Patent No.: US 12,781,935 B2
(45) Date of Patent: Nov. 3, 2026

(54) OPTICAL SYSTEM FOR A VEHICLE HEADLIGHT AND VEHICLE HEADLIGHTS

(71) Applicant: Hella GmbH & Co. KGaA, Lippstadt (DE)

(72) Inventor: Bernd Fischer, Altenbeken (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 19/297,249

(22) Filed: Aug. 12, 2025

(65) Prior Publication Data

US 2026/0055864 A1 Feb. 26, 2026

(30) Foreign Application Priority Data

Aug. 23, 2024 (DE) ......................... 102024124169.1

(51) Int. Cl.

| | |
|---|---|
| ***F21S 41/20*** | (2018.01) |
| ***F21S 41/143*** | (2018.01) |
| ***F21V 5/00*** | (2018.01) |
| ***F21V 5/04*** | (2006.01) |
| *G02B 3/00* | (2006.01) |

(52) U.S. Cl.

CPC ........... *F21S 41/285* (2018.01); *F21S 41/143* (2018.01); *F21V 5/007* (2013.01); *F21V 5/043* (2013.01); *G02B 3/0043* (2013.01); *G02B 3/005* (2013.01)

(58) Field of Classification Search

CPC ........ F21S 41/285; F21S 41/143; F21S 41/20; F21S 41/141; F21S 41/25; F21V 5/007; F21V 5/043; G02B 3/0043; G02B 3/005

See application file for complete search history.

(56) References Cited

U.S. PATENT DOCUMENTS

| | | | | |
|---|---|---|---|---|
| 2008/0316761 A1 | 12/2008 | Minano et al. | | |
| 2014/0092619 A1* | 4/2014 | Bushre | .................... | F21S 41/40 362/520 |
| 2019/0301696 A1* | 10/2019 | Fischer | ................... | F21S 41/40 |
| 2021/0231280 A1* | 7/2021 | Schreiber | .............. | F21S 41/265 |
| 2021/0239290 A1* | 8/2021 | Fischer | ................. | F21S 41/143 |
| 2022/0364702 A1* | 11/2022 | Fischer | ................. | F21S 41/151 |

FOREIGN PATENT DOCUMENTS

| | | |
|---|---|---|
| DE | 102018217213 A1 | 4/2020 |
| DE | 102018217215 A1 | 4/2020 |
| DE | 102020102226 A1 | 8/2021 |
| DE | 102022210092 A1 | 3/2024 |

* cited by examiner

*Primary Examiner* — James R Greece
*Assistant Examiner* — Michael Chiang
(74) *Attorney, Agent, or Firm* — Husch Blackwell LLP

(57) ABSTRACT

An optical system for a vehicle headlamp is provided, and includes at least one light source, at least one collimator positioned to receive light from the light source, a cylindrical lens array (CLA) positioned to receive collimated light from at least one collimator, and an irregular freeform cylindrical lens array (IFCLA) positioned to receive light from the CLA. The IFCLA includes an entry lens with numerous entry facets of irregular sizes and an exit lens with numerous exit facets. The irregularly sized entry facets on the entry lens focus light onto the middles of the respective exit facets on the exit lens.

20 Claims, 11 Drawing Sheets

OPTICAL SYSTEM FOR A VEHICLE HEADLIGHT AND VEHICLE HEADLIGHTS

CROSS REFERENCE

This application claims priority to German Application No. 102024124169.1, filed Aug. 23, 2024, the entirety of which is hereby incorporated by reference.

FIELD OF THE INVENTION

The invention relates to an optical system for a vehicle headlamp, and a vehicle headlamp.

BACKGROUND OF THE INVENTION

Every vehicle has so-called low beams. The low beams safely light the roadway at close range in front of the vehicle. Oncoming traffic should not be blinded by the low beams. For this reason, the brightness and light distribution are subject to strict requirements. Low beams also make the vehicle visible to other road users in the dark.

DE 102018217215 A1 discloses low beam headlamps for motor vehicles that make use of a lens array. A different divergence preparation by a light source assembly is exploited in the lens array to make effective use of different transversal divergencies for specific segments of the low beam light, and obtain a desired light emission.

DE 102020102226 A1 discloses a headlamp for a vehicle in which the headlamp contains a light source, a collimator lens, and lens arrays. DE 102018217213 also discloses a headlamp for a vehicle that has a lens array.

The cylindrical lens array systems (CLA systems) that are currently used have an optical efficiency of 15%-25%. Because these CLA systems use glass collimators, these systems are also very expensive. Because the spacing between the LEDs and the glass collimators is frequently less than 0.5 mm, the printed circuit board for the glass collimator can get quite hot.

BRIEF SUMMARY OF THE INVENTION

The fundamental object of the present invention is to create an optical system for a vehicle headlamp, and also a vehicle headlamp, that overcome the disadvantages of the prior art. In particular, an optical system and headlamp are to be created that have a high optical efficiency and are very inexpensive.

In a first aspect of the invention, the object is achieved by an optical system for a vehicle headlamp that comprises at least one light source, in particular at least one LED, at least one collimator, positioned to receive light from the light source, a cylindrical lens array (CLA), positioned to receive collimated light from at least one collimator, and an irregular freeform cylindrical lens array (IFCLA), positioned to receive light from the cylindrical lens array (CLA), wherein the irregular freeform cylindrical lens array (IFCLA) comprises an entry lens with numerous entry facets of irregular sizes and an exit lens with numerous exit facets, wherein the irregularly sized entry facets on the entry lens focus light onto the middles of the respective exit facets on the exit lens.

The light from the light source, in particular the LEDs, is received in the collimator and collimated to obtain parallel rays. The at least one collimator can be made of glass or a thermosetting plastic. The collimator is preferably made of plastic. The spacing between the at least one light source and the plastic collimator can be increased to 1 mm to 5 mm, preferably 1.5 mm to 2 mm, because setting the light/dark boundary no longer takes place in the collimator, but instead in the irregular freeform cylindrical lens array (IFCLA). There can be one to ten collimators, or collimating lenses. The optical system preferably has three collimators. Each collimator preferably has one dedicated light source, in particular one dedicated LED. An optical system with three collimators is inexpensive, and can also effectively light the roadway in conjunction with a downstream cylindrical lens array (CLA) and an irregular freeform cylindrical lens array (IFCLA).

The cylindrical lens array (CLA) is responsible for the horizontal diffusion of the parallel light beams to obtain the desired width of the light distribution.

The cylindrical lens array (CLA) is adjacent to the collimator, such that it receives collimated light from the collimator, which then continues to the irregular freeform cylindrical lens array (IFCLA) after its horizontal diffusion. The irregular freeform cylindrical lens array is downstream of the cylindrical lens array and positioned to receive the diffused light therefrom.

The irregular freeform cylindrical lens array has an entry lens with numerous entry facets of irregular sizes, and an exit lens with numerous exit facets. The entry facets on the entry lens focus light onto the middles of the respective exit facets on the exit lens. The irregular freeform cylindrical lens array is also responsible for the vertical light distribution. The exit facets project the light from the entry facets onto the road surface. The number of facets determines the vertical homogeneity. The irregular freeform cylindrical lens array preferably has an entry lens with more than 11 entry facets and an exit lens with more than 11 exit facets.

The entry facets are of irregular sizes, and in particular of different sizes. This means that the heights of the entry facets vary. Preferably, the heights decrease starting in a specific part of the entry lens. By way of example, the tallest entry facets are in the middle of the entry lens, and they become continuously shorter toward the upper and lower edges of the entry lens. This variation in height results in a particularly good homogenization of the light beams passing through the entry facets. Smaller increments between the heights of the facets result in better homogeneity of the light beams exiting the exit lens.

The exit facets are all the same height. The exit lens, or the numerous facets thereon, direct the light toward the roadway to obtain the light/dark boundary. Because the entry facets are of different heights, the exit facets homogenize the light beams passing through them onto the roadway, resulting in a uniform lighting thereof. The number of entry facets, the increments between their heights, and the exit facets create the light/dark boundary on the roadway. The light beams passing through these entry and exit facets can overlap to homogenize the light on the roadway, and obtain a precise light/dark boundary.

This optical system can be produced extremely inexpensively, while still remaining very efficient. Because the optical system requires no shutters, the optical efficiency can be increased to more than 60%.

An optical system is therefore preferred in which the cylindrical lens array (CLA) is configured to diffuse the light horizontally, and the irregular freeform cylindrical lens array (IFCLA) is configured to generate a light/dark boundary and a gradual vertical light distribution.

In a preferred design of the optical system, the heights of the entry facets can decrease over the height of the entire entry lens, at least in sections, in particular in increments of 20-60 mm. The height of the entry lens may vary. The height of the entry lens is preferably between 12 and 16 mm, in particular 14 mm.

The entry surface on the entry lens is preferably divided into individual facets with heights ranging from 0.06 mm to 0.6 mm. Because the vertical homogeneity is determined by the number of facets, there are ideally more than 11 entry facets.

An irregular freeform cylindrical lens array is preferred in which the tallest entry facets are in the middle of the entry lens, and the heights of the entry facets decrease toward the upper and lower edges of the entry lens. The entry lens can also have two sections with entry facets of different heights. In this case, the heights if the entry facets can decrease from the bottom of the lens to the middle, and also decrease from the middle to the top. The configuration of the entry facets is therefore repeated in this irregular freeform cylindrical lens array.

There can also be a short entry facet next to a tall entry facet in an irregular freeform cylindrical lens array, in which the differences between adjacent facets decrease from the middle of the lens to the edges. Consequently, a 600 μm tall entry facet can be next to a 60 μmm tall facet in the middle of the entry lens, while the entry facets are the same, or nearly the same height at the upper and/or lower edges of the lens. This distribution of the entry facets on the entry lens results in a good homogenization of the light beams exiting the irregular freeform cylindrical lens array.

The entry lens in the optical system can be wedge-shaped. This results in an entry lens that can be produced easily. With a wedge-shaped entry lens, the focal lengths of the exit facets can vary. By altering the thickness in the irregular freeform cylindrical lens array, the exit facets can be slightly defocused, to adjust the sharpness of the light/dark boundary to the customer's preferences.

The spacing between the entry lens and the exit lens in the optical system can be between 4.2 mm and 5.0 mm, in particular 4.6 mm, at the top, and between 5.8 mm and 6.6 mm, in particular 6.2 mm, at the bottom. This can be obtained with the wedge-shaped entry lens. Preferably, the wide part of the wedge-shaped lens is at the top, and the narrow part is at the bottom. This is a small lens, with which a distinct horizontal light/dark boundary and a very efficient gradual vertical light distribution can be generated.

All of the exit facets on the exit lens in the optical system are preferably the same height, and adjacent facets are at different angles. This also allows for a targeted control of the light distribution. This means that the tilting of the exit facets may vary. Consequently, the light beams passing through the irregular freeform cylindrical lens array can be directed in a targeted manner, specifically toward the roadway, i.e. downward. Because of the different angles of the exit facets, the light distribution on the roadway can be controlled in a targeted manner. Consequently, the roadway can be lit in a targeted manner, preferably evenly, with a very distinct light/dark boundary. Depending on the angles of the exit facets, light beams passing through the irregular freeform cylindrical lens array exit at different heights.

The focal point of each entry facet in the optical system can be in the middle of a dedicated exit facet. This results in a very efficient system that also functions within production tolerances. The exit facets project the entry facets onto the roadway, superimposing them on the road surface. The focal point of each exit facet can advantageously lie in the plane of the entry lens, in particular the entry facets. A preferred irregular freeform cylindrical lens array has a light intake side, i.e. an entry lens, and a light emitting side, i.e. an exit lens, and the focus of the entry lens is on the exit lens, and vice versa. The light beams are directed toward the roadway at the exit lens to obtain the light/dark boundary. Because the heights of the entry facets on the entry lens differ, the light beams are homogenized. The light beams are homogenized on the roadway in conjunction with the exit facets on the exit lens. This means that the roadway appears to be evenly lit.

The cylindrical lens array (CLA) and irregular freeform cylindrical lens array (IFCLA) in a preferred optical system contain a thermosetting plastic, in particular a polycarbonate, and are preferably made thereof. This means that the lenses in the cylindrical lens array (CLA) and irregular freeform cylindrical lens array (IFCLA) can be made of a thermosetting plastic, in particular a polycarbonate. This material is more heat-resistant than Poly(methyl methacrylate) (PMMA). Significantly more light can enter the cylindrical lens array (CLA) and irregular freeform cylindrical lens array (IFCLA) through an LED collimator unit.

There can also be a sector in the exit lens in which the exit facets are oriented to project light +2° to +5° upward for overhead signs. This overhead sign sector is advantageously in the middle of the exit lens. The exit facets in this overhead sign sector are angled differently than those surrounding them.

The cylindrical lens array (CLA) in the optical system can preferably contain a light intake lens with numerous intake facets, and a light emitting lens with numerous emitting facets, in which the combined intake facets form a corrugated surface, wherein the curvature of the intake facets in the middle of the cylindrical lens array (CLA) is flatter than toward the periphery.

The emitting facets on the emitting lens also form a corrugated surface. Each corrugation has just one curvature. These curvatures change over the extent of the emitting facets. With a stronger curvature, the projection of the intake facet is larger, and therefore has a shorter range. With a weaker curvature, the projection of the intake facets is smaller but has a longer range. The curvatures of the corrugations change over the extent of the emitting facets. With a stronger curvature, the light is stronger, but has a shorter range. With a weaker curvature, the light is weaker, but has a longer range.

The cylindrical lens array preferably has a light intake lens and a light emitting lens, in which at least the intake facets on the intake lens form a corrugated surface. The cylindrical lens array is responsible for the horizontal diffusion of the overall light distribution. The intake facets, i.e. the corrugations of the intake facets, are irregular in the middle of the intake lens, and have a flatter curvature than the intake facets at the edge of the intake lens. Consequently, the light is diffused significantly less and is therefore brighter in the middle. Brighter light has a longer range. The diffusing intake facets are configured such that the 1lx line in the light distribution is between ±30° and ±45°. The 1lx line is used in lighting engineering to be able to better compare the lighting widths of different systems. The curvatures of the intake facets are preferably configured such that they generate a broader light near the edges of the cylindrical lens array.

The emitting facets are focused on the entry surface of the irregular freeform cylindrical lens array, i.e. the entry facets on the entry lens in the irregular freeform cylindrical lens array.

Structures, in particular rods, can also be attached through plasma etching in a vacuum to the surfaces of the entry facets on the entry lens, the surfaces of exit facets on the exit lens, and/or the surfaces of the intake facets and/or emitting facets on the cylinder lens array (CLA) in the optical system. The make it possible to direct the light beams passing through the lenses better. These structures, in particular rods, act as optical waveguides. The Fresnel reflection of the light in each lens can be significantly reduced by this, specifically from 4% to 1%. With four lenses, this means that the efficiency of the light can be increased by 12%. The efficiency of the optical system can be further increased by these structures, in particular to more than 70%.

The at least one light source in the optical system can be on a printed circuit board on which there are adjustable spacer pins for aligning the light source with the collimator. These spacer pins keep the at least one light source, in particular the LEDs, at a precise distance to the collimator. With plastic collimators, this spacing can be increased to 1.5-2 mm, because the light/dark boundary is no longer set with the collimator, but instead with the irregular freeform cylindrical lens array (IFCLA). This ensures that the printed circuit board populated with the at least one light source, in particular at least one LED, does not overheat.

In another embodiment of the invention, the positions of the cylindrical lens array (CLA) and the irregular freeform cylindrical lens array (IFCLA) in the optical system can be reversed. In this case, the irregular freeform cylindrical lens array (IFCLA) is immediately downstream of the collimator, followed by the cylindrical lens array (CLA). This configuration also achieves the object of the invention and has the same advantages described above for the optical system regarding the first aspect of the invention.

In a second aspect of the invention, the object is achieved by a vehicle headlamp that has the optical system according to the first aspect, and a housing for the headlamp, which the optical system is downstream of. The headlamp has the same advantages as the optical system obtained in the first aspect of the invention.

The object is also achieved by a vehicle, in particular a passenger automobile, which has two such headlamps as those obtained in the second aspect of the invention.

Other advantages features and details of the invention can be derived from the following description, in which exemplary embodiments of the invention are described in detail in reference to the drawings. Any features specified in the claims and the description may be essential to the invention, in and of themselves, or in arbitrary combinations thereof.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

The same reference symbols are used in the following descriptions of some exemplary embodiments of the invention for the same technical features, even in different exemplary embodiments.

Figure 1:
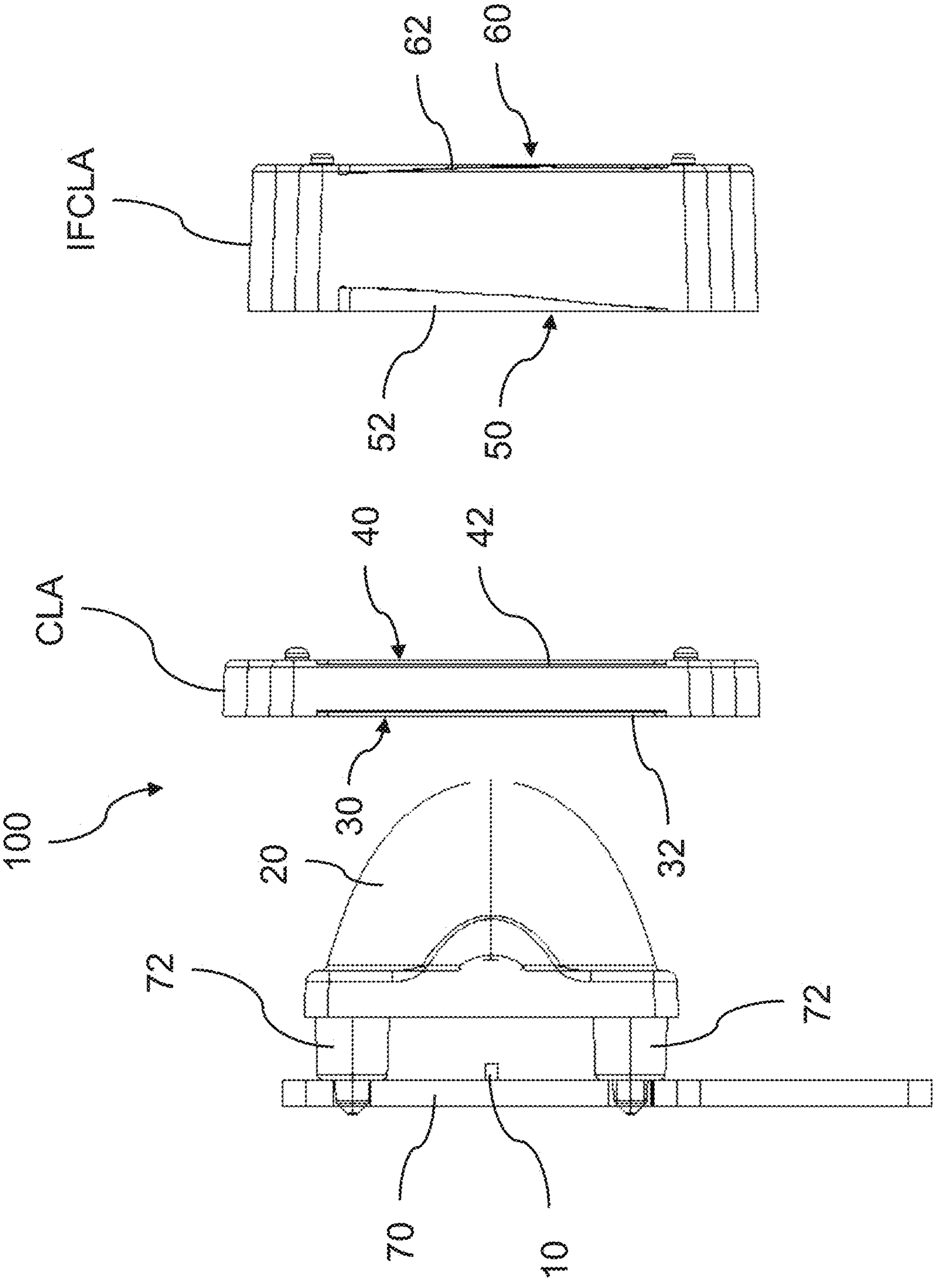
FIG. 1 shows a side view of the optical system obtained with the invention.

FIG. 1 shows the optical system 100 obtained with the invention from the side, showing where the light source 10, collimator 20, cylindrical lens array CLA, and irregular freeform cylindrical lens array IFCLA are located in relation to one another. A high optical efficiency of more than 60% is obtained by combining the collimator 20 with the cylindrical lens array CLA and the irregular freeform cylindrical lens array IFCLA. The sequence of the optical elements saves space in the design of the headlamp 200. The light from the light source 10, in particular one or more LEDs, exits the collimator 20 in parallel beams, allowing for precision control of the beams by the downstream lens elements. The greater spacing between the light sources 10 and the collimator 20, preferably between 1.5 and 2 mm, results in better heat removal, thus increasing the service life and improving the performance of the optical system 100. By using the cylindrical lens array CLA to obtain the horizontal light distribution, and the irregular freeform cylindrical lens array IFCLA for the vertical light distribution, a precise and adjustable lighting of the roadway is obtained. By using thermosetting plastic for the lens elements CLA and IFCLA, the optical system 100 can be produced inexpensively, without having a negative impact on the performance thereof. These advantages result in the optical system 100 shown in FIG. 1, which is ideal for use in modern headlamps 200, on which high demands are placed with regard to efficiency, light quality, and costs.

Figure 2:
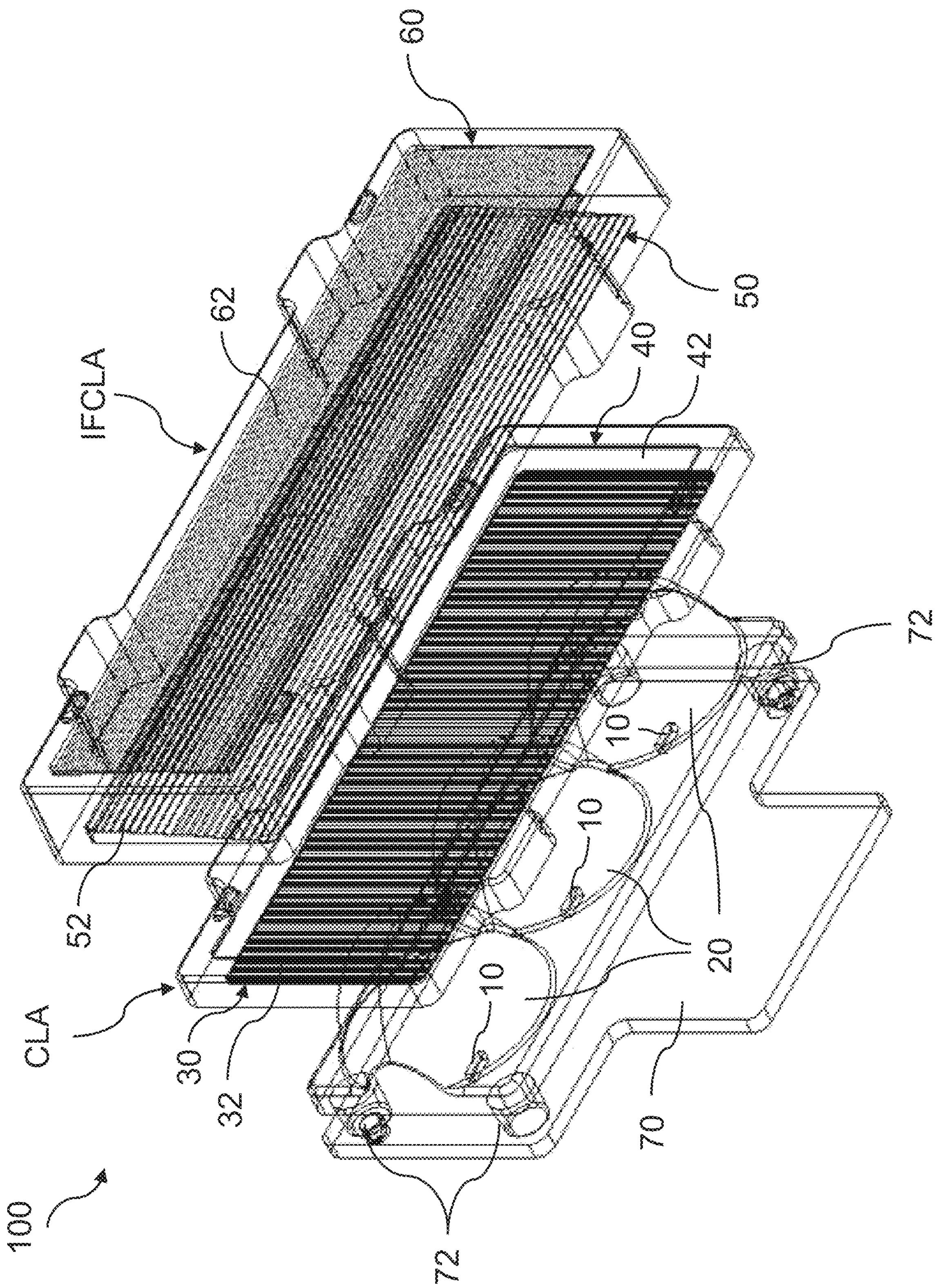
FIG. 2 shows a perspective view of the optical system obtained with the invention.

FIG. 2 shows the optical system 100 obtained with the invention from a perspective illustrating the spatial arrangement of the components. This perspective gives a better illustration of the spatial relationships between the individual components in the optical system 100. The clear separation of the individual optical elements illustrates the modular character of the optical system 100, which allows individual components to be easily adjusted or replaced. This perspective also shows how the light from the light source 10 passes through the collimator 20, CLA and IFCLA, illustrating the efficient use of this light. The spatial arrangement of the components leaves room for efficient heat removal, which has advantages regarding the service life and performance of the optical system 100.

These advantages, illustrated in the perspective view in FIG. 2, underscore the deliberate structure of the optical system 100 and its suitability for use in modern headlamps 200.

Figure 3:
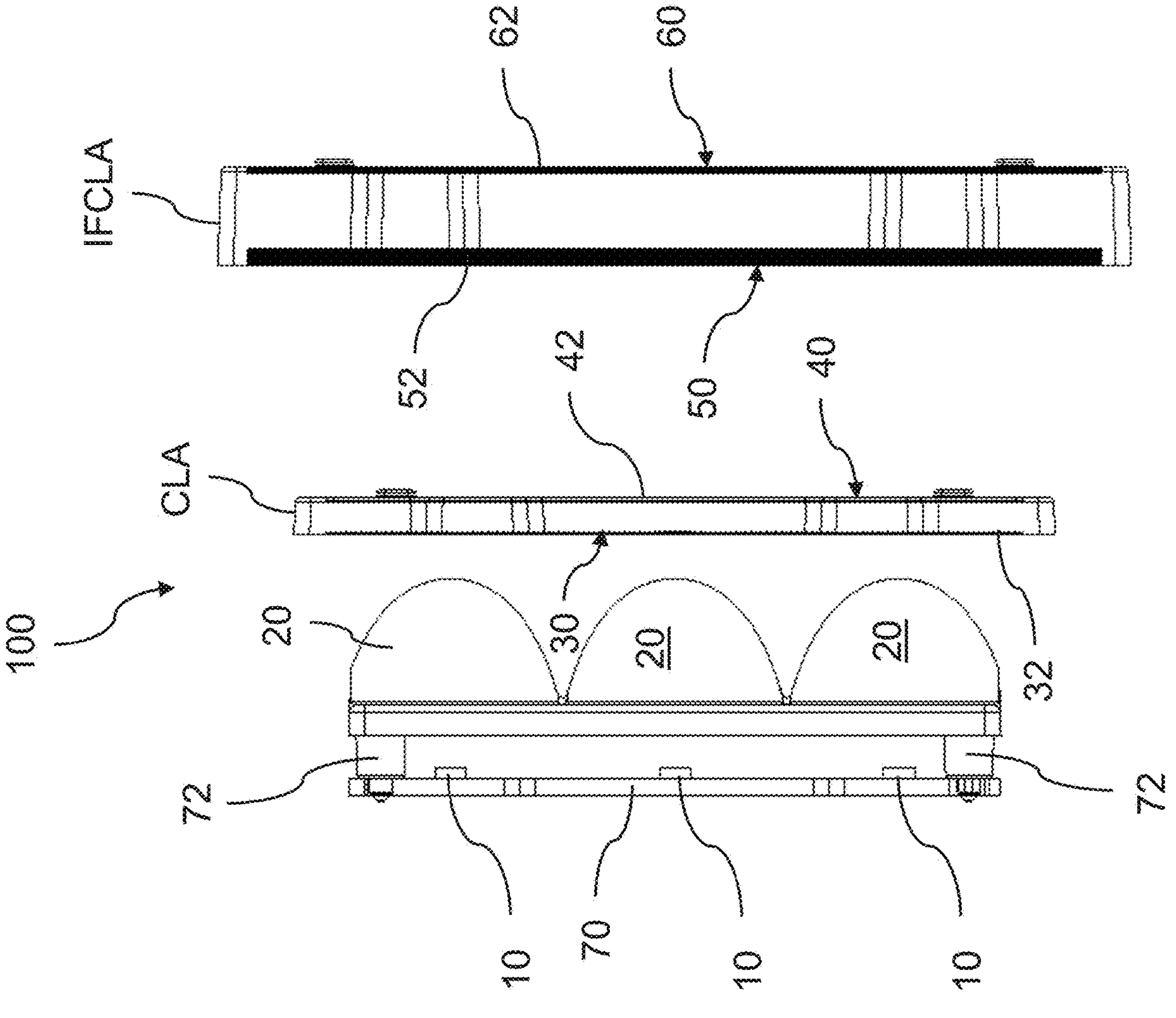
FIG. 3 shows the optical system obtained with the invention from above.

FIG. 3 shows the optical system 100 obtained with the invention from above. There are three collimators 20 therein, each of which has a dedicated light source 10, in particular an LED.

Figure 4:
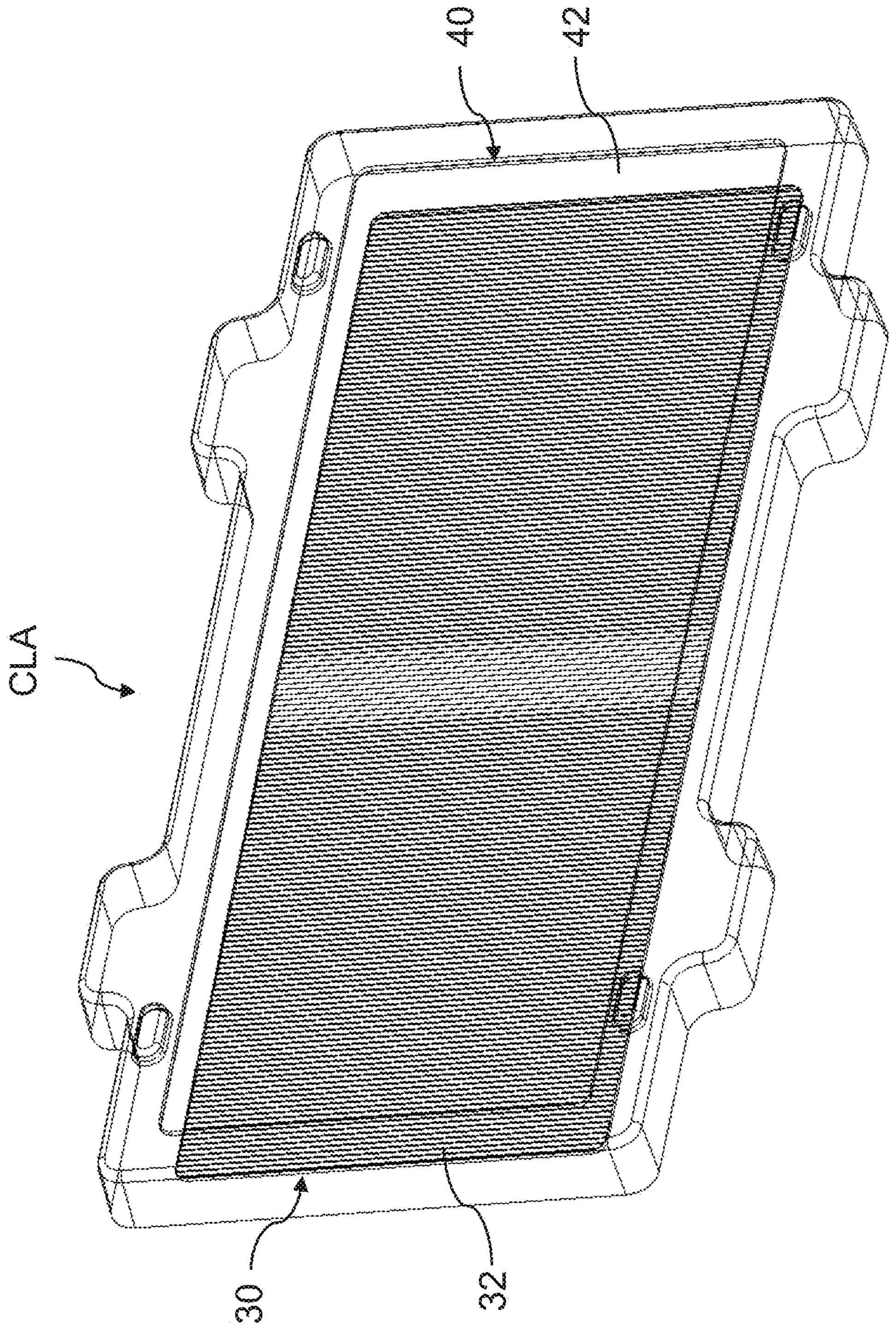
FIG. 4 shows a cylindrical lens array in the optical system.

FIG. 4 shows a detailed view of the cylindrical lens array CLA, in which the light intake lens 30 has intake facets 32, and the light emitting lens 40 has emitting facets 42. The combined intake facets 32 on the intake lens 30 form a corrugated surface, in which each corrugation has only one curvature. The curvatures of the corrugation vary over the course of the intake facets 32. The curvature of the intake facets 32 in the middle of the cylindrical lens array CLA is flatter than at the periphery. This variable curvature in the corrugation allows for targeted control of the horizontal light distribution. The flatter curvatures in the center result in brighter light, and thus a greater range in this region. The stronger curvature of the intake facets 32 at the edges results in greater diffusion, thus resulting in a broader light distribution. This corrugated design of the intake facets 32 results in an optimal balance between range and width of the light distribution, which is of major importance for an optimal lighting of the roadway. The corrugation of the intake facets 32 makes a significant contribution to the efficiency and precision of the light distribution obtained with the overall optical system 100, and is an important aspect of the performance of the headlamp 200.

Figure 5:
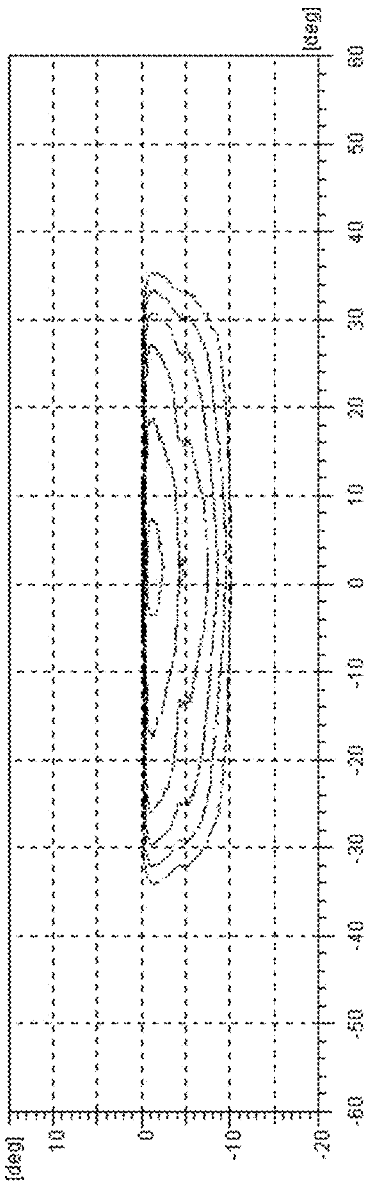
FIG. 5 shows a light distribution generated with the optical system.

FIG. 5 shows a light distribution generated with the optical system 100 obtained with the invention in which the horizontal diffusion, and vertical light distribution with the light/dark boundary, are illustrated. The light/dark boundary is primarily generated by the irregular freeform cylindrical lens array IFCLA, in particular the exit lens 60 with its exit facets 62. This boundary is horizontal, and separates the bright, lower part of the light distribution from the dark, upper part, to avoid blinding oncoming traffic. The sharpness of the light/dark boundary can be adjusted to respective requirements by slightly defocusing the exit facts 62. An overhead sign sector 80 is integrated in the light/dark boundary area, where a part of the exit facets 62 are configured to project the light +2° to +5° upward to light traffic signs. The precision formation of the light/dark boundary is obtained by the irregular sizes of the entry facets 52 on the entry lens 50 and the exit facets 62 on the exit lens 60. This characteristic light/dark boundary is an essential feature for complying with legal stipulations and is decisive for traffic safety in that it results in an optimal lighting of the roadway without blinding oncoming traffic.

Figure 6:
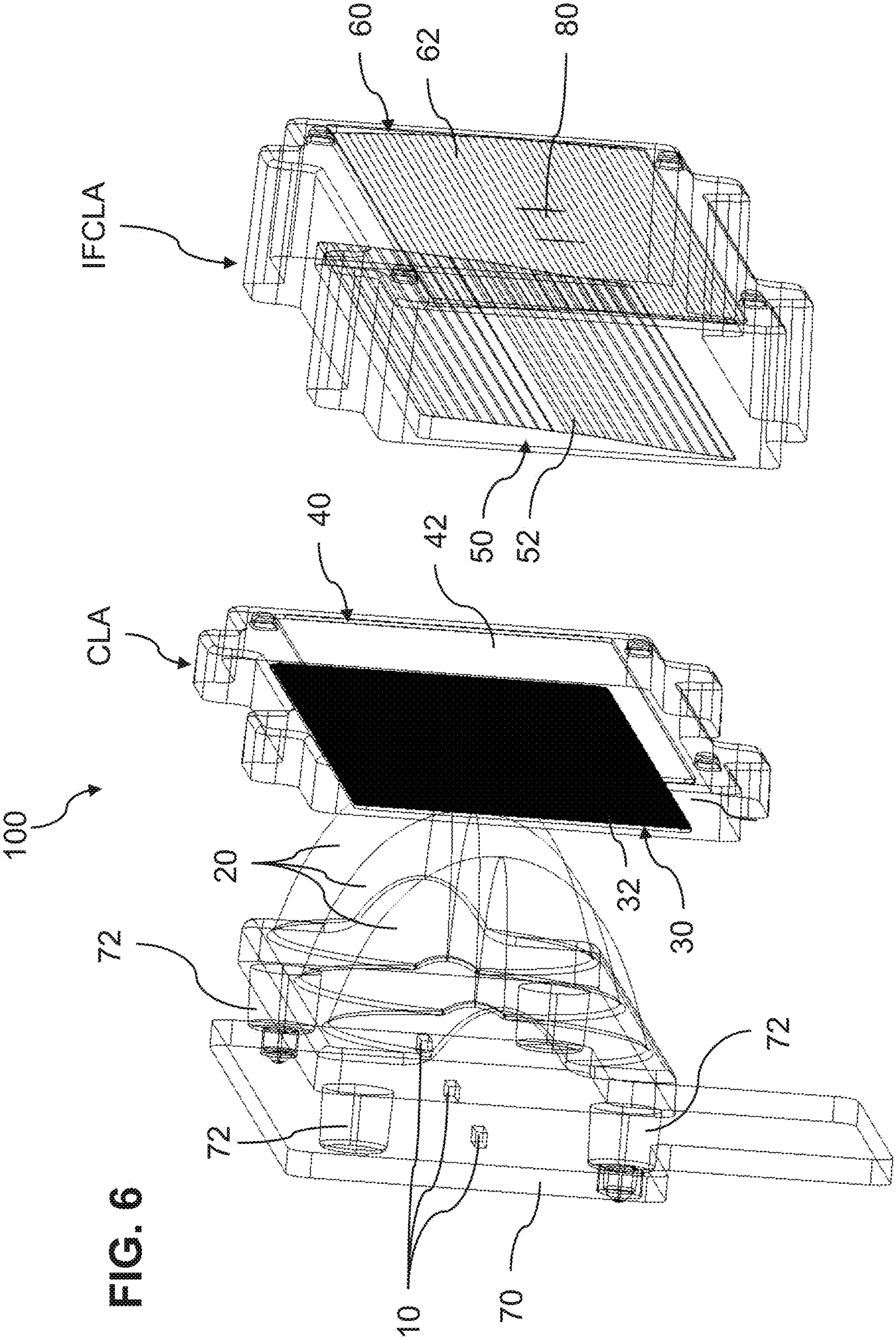
FIG. 6 shows a perspective view of the optical system obtained with the invention.

FIG. 6 shows the optical system 100 obtained with the invention from another perspective, which illustrates the placement of the light sources 10 on the printed circuit board 70, and the spacer pins 72. The spacer pins 72 are between the collimator 20 and the printed circuit board 70 populated with the light sources 10. They are used to align the light sources 10 precisely with the collimator 20, and maintain a defined spacing between these components. These spacer pins are not adjustable, and are a nominal size obtained in the injection molding process, such that any vibrations that occur have no effect on the functioning of the collimator. The spacer pins allow for a fine adjustment of the spacing. The distance between the light source 10 and the collimator 20 can be increased to 1.5 mm to 20 mm using these spacer pins 72, which has advantages with plastic collimators. This increased distance contributes to better heat removal, keeping the printed circuit board 70 with the light sources 10 from overheating. The spacer pins 72 are important in correctly positioning the optical components and contribute to the efficiency and reliability of the overall optical system 100.

Figure 7:
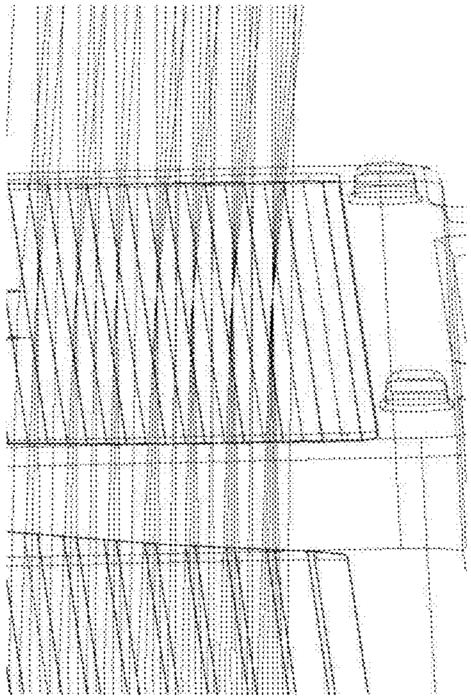
FIG. 7 shows the beam path through an irregular freeform cylindrical lens array.

FIG. 7 shows the beam paths through the irregular freeform cylindrical lens array IFCLA, illustrating the focusing of the beams by the entry facets 52 onto the middle of the exit facets 62. In particular, the focal points of the entry facets 52 can be seen in FIG. 7. The focal point of each entry facet 52 is in the middle of its dedicated exit facet 62 on the exit lens 60 in the IFCLA. This precision positioning of the focal point allows for an efficient and targeted guidance of the light through the IFCLA. The focal points of the entry facets 52 ensure an optimal overlapping of the individual light beams on the roadway, resulting in homogenous lighting thereof. Because the entry facets 52 are of different sizes, the spacings between the focal points vary slightly, thus contributing to the generation of the desired light distribution. Positioning the focal points in the centers of the exit facets 62 contributes to the formation of the light/dark boundary and allows for precision control of the vertical light distribution. This placement of the focal points results in an optical system 100 that can accommodate production tolerances by compensating for slight differences in the positions of the facets 52, 62.

Figure 8:
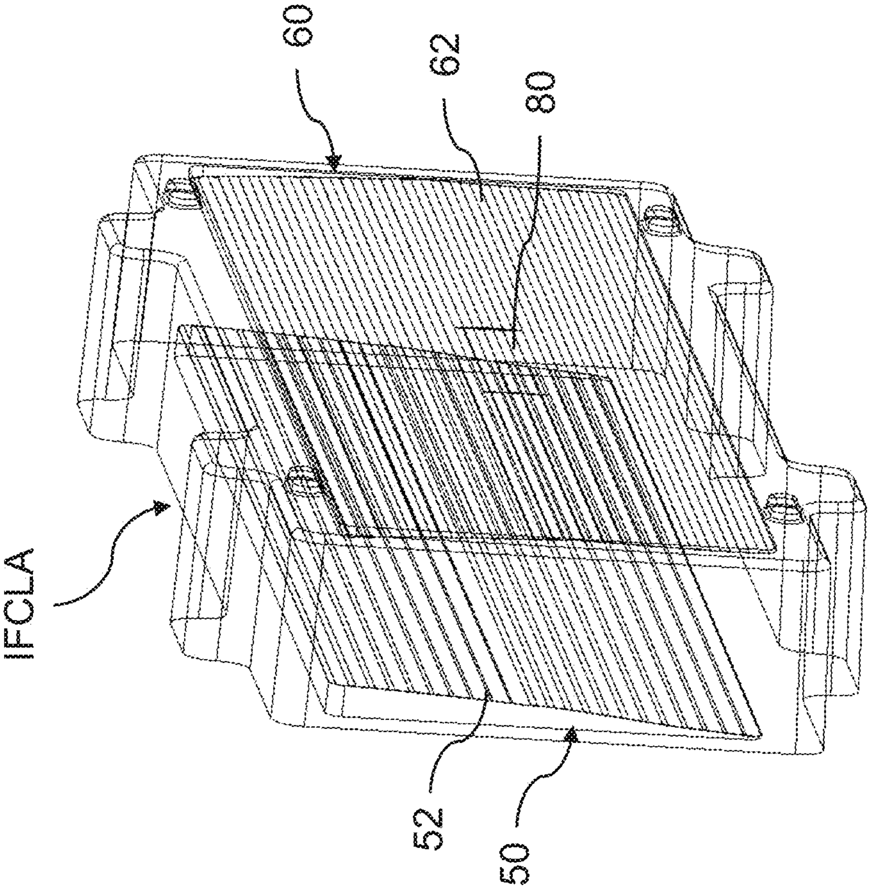
FIG. 8 shows a perspective view of the irregular freeform cylindrical lens array in the optical system obtained with the invention.

FIG. 8 shows a perspective view of the irregular freeform cylindrical lens array IFCLA in which the irregularly sized entry facets 52 on the entry lens 50 and the exit facets 62 on the exit lens 60 are visible. In particular, the wedge-shaped design of the entry lens 50 with its entry facets 52 can be seen. The overall entry lens 50 is in the shape of a wedge, which is formed by the entry facets 52. The thicker part of the wedge is at the bottom of the entry lens 50, and the narrow part is at the top. As a result, the spacing between the entry lens 50 and the exit lens 60 varies over the height of the IFCLA. At the top, the spacing is approx. 4.6 mm, and approx. 6.2 at the bottom. This wedge-shaped design results in irregular focal lengths of the exit facets 62. These irregularities in the focal lengths contribute to the precision formation of the light/dark boundary, allowing for a fine alignment of the vertical light distribution. The wedge shape allows for a slight defocusing of the exit facets 62, such that the sharpness of the light/dark boundary can be adjusted to specific customer requirements.

Figure 9:
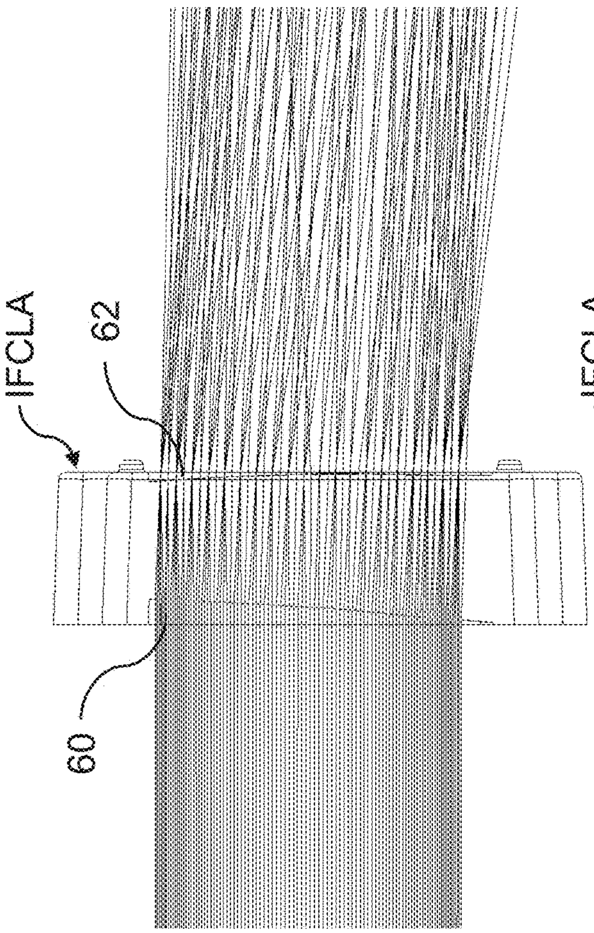
FIG. 9 shows the focal points of the entry facets in the centers of the exit facets in the irregular freeform cylindrical lens array.

FIG. 9 illustrates the focal points of the entry facets 52 in the centers of the respective exit facets 62 in the irregular freeform cylindrical lens array IFCLA. The beam paths of the light generated by the light sources 10 through the entry facets 52 on the entry lens 50 and the exit lens 60 are shown. Each entry facet 52 focusses the light striking it onto the middle of its dedicated exit facet 62 on the exit lens 60. The focal points are in the exact centers of the respective exit facets 62. Because of the different sizes of the entry facets 52, the lengths and angles of beam paths vary slightly.

Figure 10:
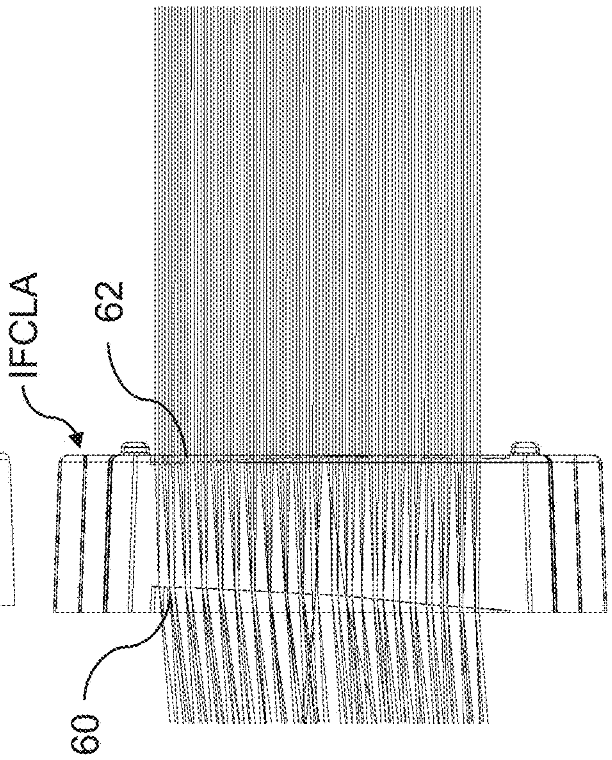
FIG. 10 shows the focal points of the exit facets in the plane of the entry facets in the irregular freeform cylindrical lens array.

FIG. 10 shows the focal points of the exit facets 62 in the plane of the entry facets 52 in the irregular freeform cylindrical lens array IFCLA. The beam paths are in the other direction here. The focal points of the exit facets 62 lie in the plane of the entry lens 50, specifically the plane of the entry facets 52. This illustrates the reciprocal optical relationship between the entry facets 52 and exit facets 62. The beam paths illustrate how the light is directed by the exit facets 62 and projected onto the roadway. FIGS. 9 and 10 both show how the precision alignment of the beam paths through the entry facets 52 and exit facets 62 contributes to the efficient directing of the light and generating the desired light distribution. This configuration allows for optimal overlapping of the light beams, and contributes substantially to the formation of the light/dark boundary and the homogenous lighting of the roadway.

Figure 12:
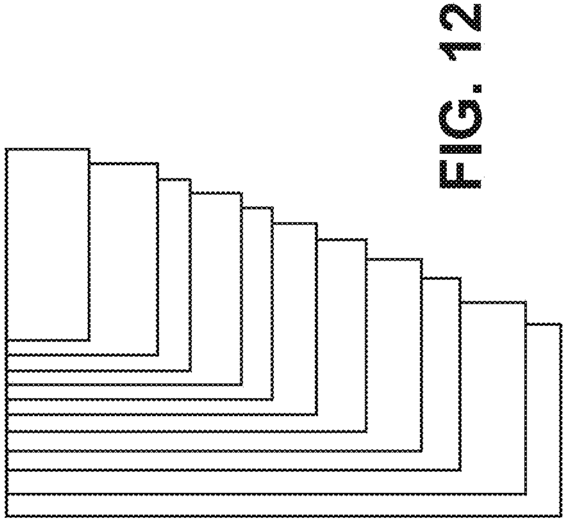
FIG. 12 shows overlapping parts of the individual entry facets on an irregular freeform cylindrical lens array.
Figure 11:
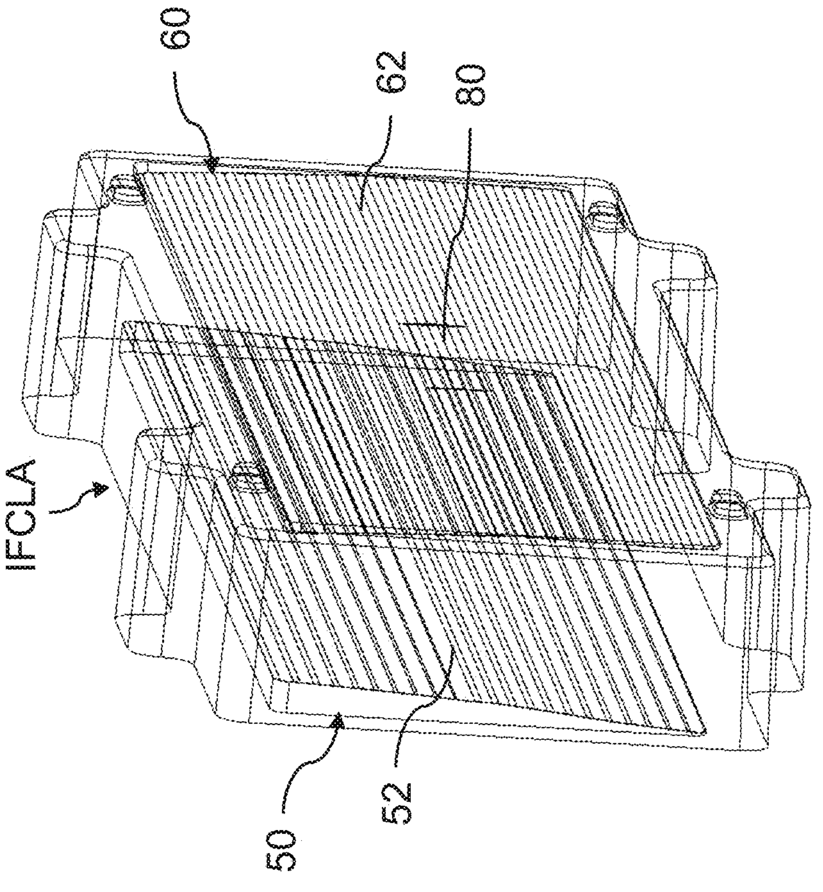
FIG. 11 shows a perspective view of an irregular freeform cylindrical lens array that has an overhead sign sector in the optical system obtained with the invention.

FIG. 11 shows a perspective view of the irregular freeform cylindrical lens array IFCLA with an overhead sign sector 80 in the exit facets 62 on the exit lens 60. FIG. 11 shows the irregular freeform cylindrical lens array (IFCLA) with a special overhead sign sector 80, while FIG. 12 show the overlapping parts of the individual exit facets 62. A special sector for lighting overhead signs is integrated in the middle of the exit lens 60. The entry facets 52 in this sector are designed to interact with the corresponding exit facets 62 to deflect light +2° to +5° upward. This special design for the exit facets 62 enables lighting of traffic signs above the road, without having a negative impact on the fundamental light distribution.

FIG. 12 illustrates the overlapping parts of thew individual exit facets 62 in the irregular freeform cylindrical lens array IFCLA that contribute to the homogenization of the light distribution. FIG. 12 shows how the light distributions of the individual exit facets 62 overlap. This overlapping is the result of the precision design of the entry facets 52, which focus the light onto the exit facets 62. The different sizes and shapes of the entry facets 52 contribute to the generation of this overlapping light distribution. This overlapping produces a homogenous overall light distribution on the roadway, in which a sharp light/dark boundary is also generated.

Figure 13:
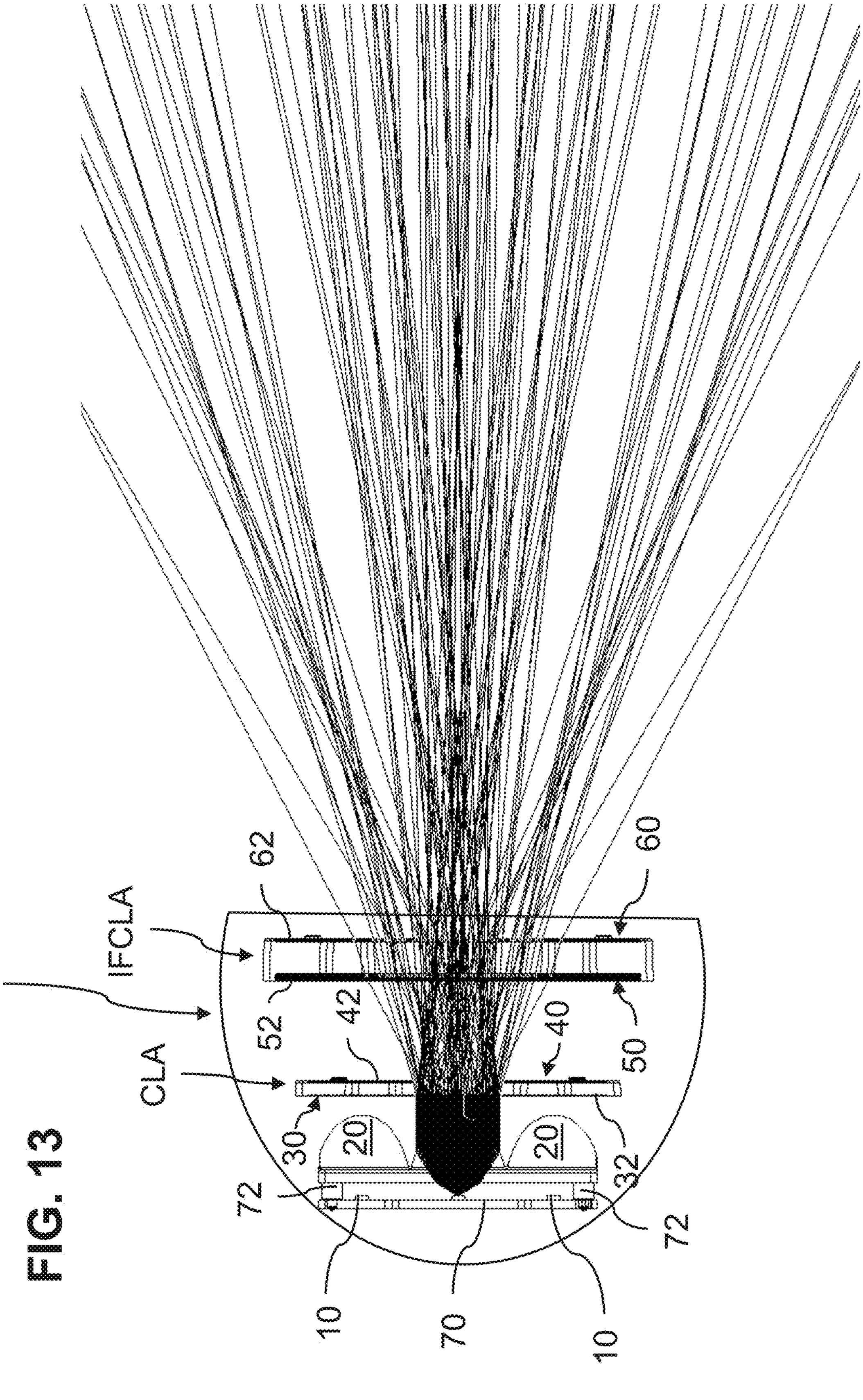
FIG. 13 shows a cylindrical lens array in the optical system with beam paths from above.

FIG. 13 shows the cylindrical lens array CLA from above, with beam paths illustrating the horizontal diffusion of the light. The intake facets 32 in the CLA are curved, and each facet has a specific curvature. The beam paths illustrate the horizontal diffusion of the light through the intake facets 32. The intake facets 32 in the middle have a flatter curvature. This results in less horizontal diffusion of light beams, resulting in brighter light with a longer range in the middle of the light distribution. The intake facets 32 have a stronger curvature at the edges. This diffuses the light horizontally to a greater extent, resulting in a broader light distribution. The different curvatures of the intake facets 32 allow for precision control of the horizontal light distribution through targeted direction of the beams. The beam paths show how the light strikes the emitting facets after passing through the intake facets 32, and is then deflected further. The beam paths illustrate how the light is directed by the entry facets 52 in the IFCLA and focused onto the exit facets 62. The different sizes of the entry facets 52 result in different diffractions and deflections, thus contributing to the generation of the desired light distribution. The beam paths in the middle of the IFCLA tend to be straighter, indicating less deflection in this area. The beam paths are deflected more at the edges of the IFCLA, which contributes to the formation of the edges of the light distribution. The beam paths demonstrate how the light strikes the exit facets 62 after passing through the entry facets 52 and is further deflected there. The beam paths passing through the entry facets 52 and exit facets 62 in the IFCLA generate the desired horizontal and vertical light distribution, including the precision light/dark boundary. This special design for the entry facets 52 and exit facets 62 in the IFCLA, and the resulting beam paths, contribute substantially to the efficient and precise light direction, resulting in the optimal light distribution for the headlamp 200, including the generation of a sharp light/dark boundary and a gradual vertical light distribution. The individual components shown therein are parts of a headlamp 200.

Figure 14:
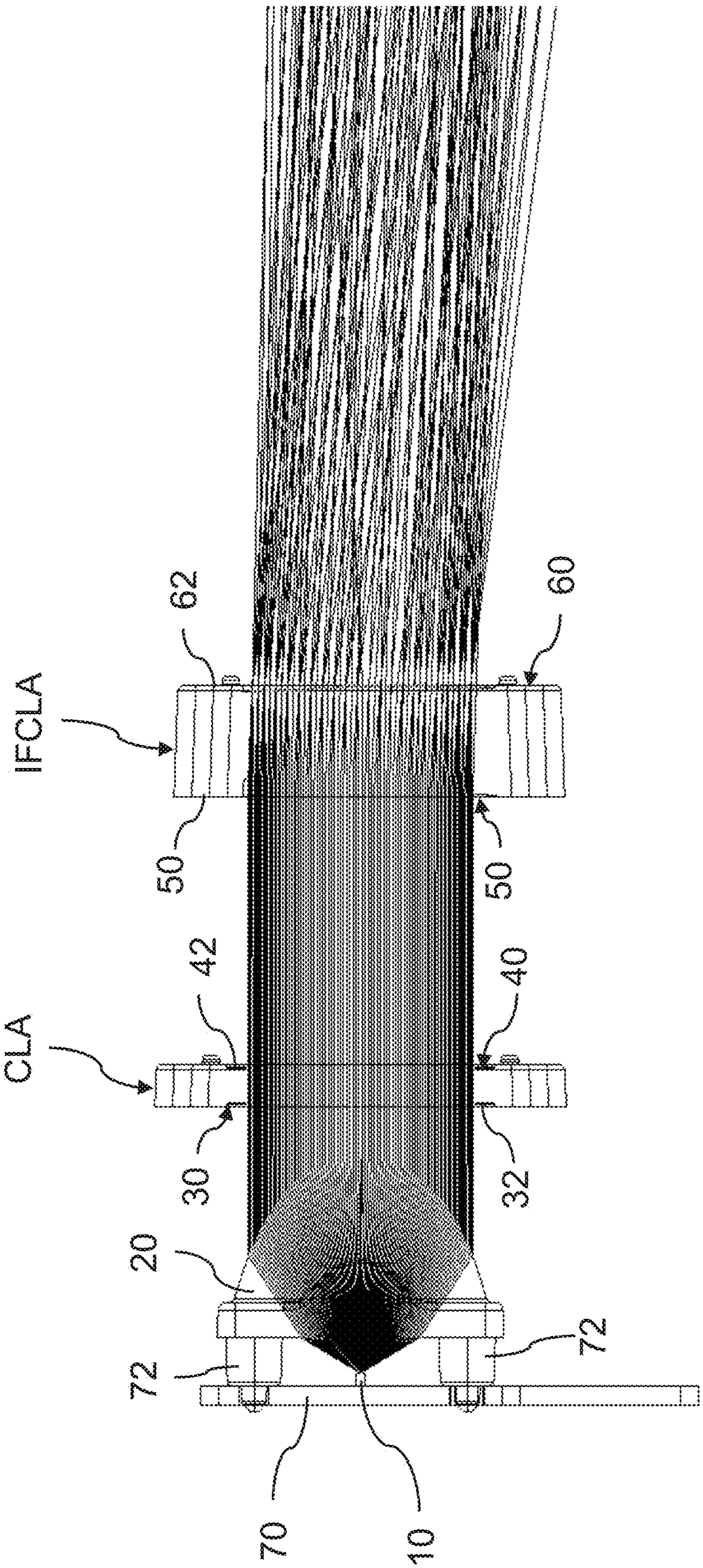
FIG. 14 shows a side view of a cylindrical lens array in the optical system with beam paths.

FIG. 14 shows a side view of the cylindrical lens array CLA with beam paths illustrating the vertical light distribution and the formation of the light/dark boundary. Specifically, FIG. 14 shows a cut through the optical system 100 with the beam paths in a side view. The intake facets 32 in the CLA form a corrugated surface in which each corrugation has its own curvature. The beam paths show how the light entering them from the collimator 20 is diffracted and deflected by the lenses in the CLA and the IFCLA. The intake facets 32 in the middle of the CLA have a flatter curvature, resulting in less diffusion of the light. This results in brighter light with a greater range in this area. The intake facets 32 have a stronger curvature at the edges of the CLA, resulting in broader diffusion of the light. This generates broader light at the edges. The different curvatures of the intake facets 32 allow for precision control of the horizontal light distribution. The beam paths illustrate how the light strikes the emitting facets 62 in the IFCLA after passing through the entry facets 52 in the CLA, and is then directed further. The beam paths through the entry facets 52 and exit facets 62 generate the desired overall light distribution with a 1lx line between ±30° and ±45°.

LIST OF REFERENCE SYMBOLS

10 light source
20 collimator
CLA cylindrical lens array
30 light intake lens
32 intake facets
40 light emitting lens
42 emitting facets
IFCLA irregular freeform cylindrical lens array
50 entry lens
52 entry facets
60 exit lens
62 exit facets
70 printed circuit board
72 spacer pins
80 overhead sign sector
100 optical system
200 vehicle headlamp

The invention claimed is:

1. An optical system for a vehicle headlamp, the optical system comprising:

at least one light source;

at least one collimator positioned to receive light from the at least one light source;

a cylindrical lens array (CLA) positioned to receive collimated light from at least one collimator; and an irregular freeform cylindrical lens array (IFCLA) positioned to receive light from the cylindrical lens array (CLA), the irregular freeform cylindrical lens array (IFCLA) including an entry lens with numerous entry facets of irregular sizes and an exit lens with numerous exit facets, wherein the irregularly sized entry facets on the entry lens focus light onto the middles of respective exit facets on the exit lens.

2. The optical system according to claim 1, wherein the cylindrical lens array (CLA) diffuses the light horizontally, and the irregular freeform cylindrical lens array (IFCLA) generates a horizontal light/dark boundary and a gradual vertical light distribution.

3. The optical system according to claim 1, wherein heights of the entry facets on the entry lens in the irregular freeform cylindrical lens array (IFCLA) are between 0.03 mm and 0.6 mm.

4. The optical system according to claim 1, wherein heights of the entry facets diminish, at least in sections, over the height of the overall entry lens.

5. The optical system according to claim 1, wherein the entry lens is wedge-shaped.

6. The optical system according to claim 1, wherein the distance from a top of the entry lens to the exit lens is 4.2 mm to 5.0 mm, and the distance from a bottom of the entry lens to the exit lens is 5.8 mm to 6.6 mm.

7. The optical system according to claim 1, wherein all of the exit facets on the exit lens are the same height, and adjacent exit facets on the exit lens are at different angles, at least in sections.

8. The optical system according to claim 1, wherein a focal point of each entry facet lies in the middle of its dedicated exit facet.

9. The optical system according to claim 1, wherein a focal point of each exit facet lies in a plane of the entry lens.

10. The optical system according to claim 9, wherein the focal point of each exit facet lies in the plane of the entry facets.

11. The optical system according to claim 1, wherein the entry lens has at least 11 entry facets of irregular sizes.

12. The optical system according to claim 1, wherein the cylindrical lens array (CLA) and irregular freeform cylindrical lens array (IFCLA) contain thermosetting plastic.

13. The optical system according to claim 12, wherein the IFCLA is made from a polycarbonate.

14. The optical system according to claim 1, wherein the exit lens has an overhead sign sector in the exit facets, in which a portion of the exit facets project light +2° to +5° upward.

15. The optical system according to claim 1, wherein the cylindrical lens array (CLA) has a light intake lens with a plurality of intake facets and a light emitting lens with a plurality of emitting facets, wherein the intake facets are combined to form a corrugated surface.

16. The optical system according to claim 15, wherein the curvature of the intake facets is flatter in the middle of the cylindrical lens array (CLA) than at the edges thereof.

17. The optical system according to claim 1, wherein the cylindrical lens array (CLA) has structural elements which are attached to the surfaces of the entry facets on the entry lens, the surfaces of the exit facets on the exit lens, and/or the surfaces of the intake facets and/or emitting facets in the cylindrical lens array (CLA), through plasma etching in a vacuum.

18. The optical system according to claim 17, wherein the structural elements are rods.

19. The optical system according to claim 1, wherein the at least one light source is on a printed circuit board, and there are adjustable spacer pins between the at least one collimator and the printed circuit board for aligning the at least one light source with the at least one collimator.

20. A vehicle headlamp that contains an optical system according to claim 1, and a headlamp housing downstream of the optical system.

* * * * *